(12) United States Patent
Yu et al.

(10) Patent No.: US 12,552,674 B2
(45) Date of Patent: Feb. 17, 2026

(54) FIBER-REINFORCED DOUBLE-NETWORK AEROGEL COMPOSITE ARTICLES AND METHODS OF MANUFACTURE

(71) Applicant: ARMACELL ENTERPRISE GMBH & CO. KG, Schönefeld (DE)

(72) Inventors: Yuxi Yu, Nantong (CN); Zhicheng Zheng, Münster (DE)

(73) Assignee: ARMACELL ENTERPRISE GMBH & CO. KG, Schönefeld (DE)

( * ) Notice: Subject to any disclaimer, the term of this patent is extended or adjusted under 35 U.S.C. 154(b) by 0 days.

(21) Appl. No.: 18/991,308

(22) Filed: Dec. 20, 2024

(65) Prior Publication Data

US 2025/0388479 A1 Dec. 25, 2025

Related U.S. Application Data

(60) Provisional application No. 63/701,243, filed on Sep. 30, 2024, provisional application No. 63/662,878, filed on Jun. 21, 2024.

(51) Int. Cl.
*C01G 49/06* (2006.01)
*C01B 33/158* (2006.01)

(52) U.S. Cl.
CPC .......... *C01B 33/1585* (2013.01); *C01G 49/06* (2013.01); *C01P 2006/32* (2013.01)

(58) Field of Classification Search
None
See application file for complete search history.

(56) References Cited

U.S. PATENT DOCUMENTS

| | | | |
|---|---|---|---|
| 5,525,643 A | 6/1996 | Macip-Boulis et al. | |
| 5,538,931 A * | 7/1996 | Heinrichs | B01J 23/40 502/238 |
| 6,068,882 A * | 5/2000 | Ryu | C04B 14/302 427/403 |
| 6,426,371 B1 | 7/2002 | Li et al. | |
| 8,518,335 B2 | 8/2013 | Joung et al. | |
| 8,961,919 B2 | 2/2015 | Joung et al. | |
| 9,181,486 B2 | 11/2015 | Evans et al. | |
| 9,868,843 B2 | 1/2018 | Evans et al. | |
| 10,227,472 B2 | 3/2019 | Evans et al. | |
| 10,233,302 B2 | 3/2019 | Evans et al. | |
| 10,233,303 B2 | 3/2019 | Evans et al. | |
| 10,253,159 B2 | 4/2019 | Evans et al. | |
| 10,487,263 B2 | 11/2019 | Evans et al. | |
| 10,633,256 B1 | 4/2020 | Guo et al. | |
| 11,208,539 B2 | 12/2021 | Evans et al. | |
| 11,261,380 B2 | 3/2022 | Evans et al. | |
| 11,261,563 B2 | 3/2022 | Joung et al. | |
| 11,274,044 B2 * | 3/2022 | Kim | C01B 33/158 |
| 11,279,622 B2 | 3/2022 | Kim et al. | |
| 11,549,059 B2 | 1/2023 | Evans et al. | |
| 11,597,814 B2 | 3/2023 | Evans et al. | |
| 11,634,641 B2 | 4/2023 | Evans et al. | |
| 11,807,734 B2 | 11/2023 | Evans et al. | |
| 11,807,736 B2 | 11/2023 | Evans et al. | |
| 11,866,324 B2 | 1/2024 | Kang et al. | |
| 12,168,747 B2 | 12/2024 | Evans et al. | |
| 2006/0223965 A1 | 10/2006 | Trifu | |
| 2012/0238445 A1 | 9/2012 | Ebert et al. | |
| 2014/0255642 A1 | 9/2014 | White et al. | |
| 2014/0273701 A1 | 9/2014 | Samanta et al. | |
| 2015/0141544 A1 | 5/2015 | Meador et al. | |
| 2016/0380244 A1 | 12/2016 | Evans et al. | |
| 2024/0026121 A1 | 1/2024 | Evans et al. | |
| 2024/0360363 A1 | 10/2024 | Evans et al. | |

FOREIGN PATENT DOCUMENTS

| | | |
|---|---|---|
| CN | 1546312 A | 11/2004 |
| CN | 101792299 B | 5/2012 |
| CN | 103011745 A | 4/2013 |
| CN | 103113043 A | 5/2013 |
| CN | 103432968 A | 12/2013 |
| CN | 106608723 A | 5/2017 |
| CN | 105236418 B | 10/2017 |
| CN | 105692631 B | 3/2019 |
| CN | 109574026 A | 4/2019 |
| CN | 109603696 A | 4/2019 |
| CN | 107694490 B | 8/2019 |
| CN | 110339814 A | 10/2019 |
| CN | 106587080 B | 2/2020 |
| CN | 109058662 B | 8/2020 |
| CN | 113651334 A | 11/2021 |
| CN | 113845692 A | 12/2021 |
| CN | 114592354 A | 6/2022 |
| CN | 114751418 A | 7/2022 |
| CN | 112646229 B | 8/2022 |
| CN | 115012208 A | 9/2022 |
| CN | 115321546 A | 11/2022 |
| CN | 113716572 B | 1/2023 |
| CN | 113563046 B | 3/2023 |
| CN | 115784299 A | 3/2023 |
| CN | 114751761 B | 4/2023 |
| CN | 113773044 B | 7/2023 |
| CN | 116408012 A | 7/2023 |
| CN | 117229036 A | 12/2023 |
| CN | 117531452 A | 2/2024 |
| EP | 489319 A2 | 6/1992 |
| EP | 3498672 A1 | 6/2019 |

(Continued)

OTHER PUBLICATIONS

Chen, 2016, Preparation and characterization of monolithic Al2O3—SiO2 aerogel, Journal of the Ceramic Society of Japan, 124(4):442-447.

(Continued)

*Primary Examiner* — Michael Forrest
(74) *Attorney, Agent, or Firm* — Brown Rudnick LLP; Ian G. DiBernardo

(57) ABSTRACT

Disclosed herein are fiber-reinforced double-network aerogel composite articles and methods of manufacture. The composite articles comprise primary aerogel network domains and secondary aerogel network domains, which differ from each other in their chemical compositions, but are covalently interconnected.

30 Claims, No Drawings

(56) References Cited

FOREIGN PATENT DOCUMENTS

| | | | |
|---|---|---|---|
| FR | 2873677 A1 | 2/2006 | |
| KR | 10-2012-0054389 A | 5/2012 | |
| KR | 10-2012-0070948 A | 7/2012 | |
| KR | 10-2012-0078665 A | 7/2012 | |
| WO | 2011010577 A1 | 1/2011 | |
| WO | 2012000184 A1 | 1/2012 | |
| WO | 2012098463 A1 | 7/2012 | |
| WO | 2013053951 A1 | 4/2013 | |
| WO | 2018049965 A1 | 3/2018 | |
| WO | WO-2022189425 A1 * | 9/2022 | ......... C01B 33/1585 |
| WO | 2023040965 A1 | 3/2023 | |

OTHER PUBLICATIONS

El Mir, 2008, Luminescence of composites based on oxide aerogels incorporated in silica glass host matrix, Materials Science and Engineering:C, 28(5-6):771-776.

Huang, 2011, Synthesis of High Surface Area Silica Aero-gels via Microwave Assisted Sol-Gel Method, Fine Chemicals, 28(4):319-323.

Kim, 2013, Bi-phase ceramic composite using an interpenetrating network, Surface and Coatings Technology, 215:300-305.

Luo, 2013, Synthesis of paramagnetic iron incorporated silica aerogels by ambient pressure drying, 142(1):113-118.

Raileanu, 2003, $Fe_2O_3$—$SiO_2$ Nanocomposites Obtained By Different Sol-Gel Routes, Journal of Optoelectronics and Advanced Materials, 5(3):693-698.

Rao, 2003, Hydrophobicity and physical properties of TEOS based silica aerogels using phenyltriethoxysilane as a synthesis component, Journal of Materials Science, 38:4407-4413.

Rao, 2004, Organic Surface Modification of TEOS Based Silica Aerogels Synthesized by Co-Precursor and Derivatization Methods, Journal of Sol-Gel Science and Technology, 30:141-147.

Yu, 2014, Preparation of flexible, hydrophobic, and oleophilic silica aerogels based on a methyltriethoxysilane precursor, Journal of Materials Science, 49:7715-7722.

Yu, 2023, Superhydrophobic, heat-resistant alumina-methylsilsesquioxane hybrid aerogels with enhanced thermal insulating performance in high humidity, 49(8):12625-12632.

Yu, 2024, Preparation of $SiO_2/Fe_2O_3$ composite aerogels for thermal insulation enhancement, Ceramics International, 50(2):2976-2986.

Zaharescu, 2000, SiO2-Iron Oxide Composites Obtained by Sol-Gel Method, Journal of Sol-Gel Science and Technology, 19:631-635.

* cited by examiner

FIBER-REINFORCED DOUBLE-NETWORK AEROGEL COMPOSITE ARTICLES AND METHODS OF MANUFACTURE

CROSS-REFERENCE TO RELATED APPLICATIONS

This application claims the benefit of and priority to U.S. Provisional Application No. 63/662,878, which was filed on Jun. 21, 2024, and U.S. Provisional Application No. 63/701,243, which was filed on Sep. 30, 2024, both of which are hereby incorporated by reference in their entirety.

BACKGROUND

Existing aerogel composite articles typically comprise a single aerogel material, usually a silica aerogel. They also typically include one or more fillers and/or one or more opacifying compounds embedded within the silica aerogel. Improved aerogel composite articles are needed, which are more stable and can minimize or eliminate usage of fillers and/or standalone opacifying compounds.

SUMMARY

The present invention provides, in various embodiments, methods for the preparation of fiber-reinforced double-network aerogel composite articles as well as composite articles manufactured by this method.

In some embodiments, the invention provides a method of preparing a fiber-reinforced double-network aerogel composite article, the method comprising: providing an aerogel composite dispersion comprising a primary aerogel powder, one or more secondary silane precursors, and an organic solvent, wherein the aerogel composite dispersion is formed by: (i) preparing a primary aerogel dispersion by dispersing the primary aerogel powder in the organic solvent; (ii) adding the secondary silane precursors without hydrolysis to the primary aerogel dispersion obtained in step (i), and mixing to disperse the secondary silane precursors around the primary aerogel powder; (iii) adding an acidic catalyst to the result of step (ii) to catalyze hydrolysis of the secondary silane precursors; and (iv) adding a basic catalyst to the result of step (iii) to catalyze gelation of the secondary silane precursors; providing a fibrous article comprising inorganic or organic fibers; combining the fibrous article and the aerogel composite dispersion, whereby gelation of the secondary silane precursors occurs within the fibrous article; and partially or completely removing the organic solvent to obtain the fiber-reinforced double-network aerogel composite article.

In some embodiments, the primary aerogel powder is a non-hydrophobic powder with opacifying effect, and is selected from the group consisting of alumina aerogel, iron oxide aerogel, alumina-silica hybrid aerogel, iron oxide-silica hybrid aerogel, and combinations thereof.

In some embodiments, the primary aerogel powder is iron oxide aerogel, iron oxide-silica hybrid aerogel, or a combination thereof.

In some embodiments, the organic solvent is an alcohol solvent or a mixture of alcohol solvents.

In some embodiments, the one or more secondary silane precursors are selected from the group consisting of tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), polyethylene trimethoxysilane.

In some embodiments, a weight ratio of the primary aerogel powder to the one or more secondary silane precursors in the aerogel composite dispersion is 0.01:1 or higher.

In some embodiments, the acid catalyst comprises deionized water and an inorganic acid, and wherein a molar ratio of the secondary silane precursors to the organic solvent to the deionized water to the inorganic acid is 1:20-30:3-5:104-5.104.

In some embodiments, the inorganic acid is hydrochloric acid.

In some embodiments, a molar ratio of the secondary silane precursors to the basic catalyst is 1:0.015-0.05.

In some embodiments, the basic catalyst is ammonia with a molar concentration of 0.2 mol/L in alcohol solvent.

In some embodiments, the fibrous article is selected from wovens or non-wovens composed of glass fiber, ceramic fiber, silica fiber, basalt fiber, or organic fiber.

In some embodiments, the combining comprises impregnating the aerogel composite dispersion into the fibrous article.

In some embodiments, the removing the organic solvent comprises supercritical drying or ambient pressure drying.

In some embodiments, the removing the organic solvent comprises supercritical drying using ethanol as the drying medium and nitrogen as the carrier gas.

In some embodiments, a weight ratio of aerogel to fiber in the fiber-reinforced double-network aerogel composite article is 1:4 or higher.

In some embodiments, the invention provides a fiber-reinforced double-network aerogel composite article prepared by the method described above.

In some embodiments, a weight ratio of the primary aerogel powder to the one or more secondary silane precursors in the aerogel composite dispersion is 0.01:1 or higher.

In some embodiments, the invention provides a fiber-reinforced double-network aerogel composite article comprising a fibrous article impregnated with (a) a primary aerogel formed from a non-hydrophobic primary aerogel powder with opacifying effect selected from the group consisting of alumina aerogel, iron oxide aerogel, alumina-silica hybrid aerogel, iron oxide-silica hybrid aerogel, and combinations thereof; and (b) a secondary aerogel formed from one or more secondary silane precursors selected from the group consisting of tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), polyethylene trimethoxysilane, wherein the composite article exhibits a thermal conductivity at 300° C. of not more than 0.038 W/m·K.

In some embodiments, the composite article exhibits a thermal conductivity at 500° C. of not more than 0.071 W/m·K.

In some embodiments, the primary aerogel is formed from iron oxide aerogel, and the composite article exhibits a thermal conductivity at 300° C. of not more than 0.036 W/m·K.

In some embodiments, the primary aerogel is formed from iron oxide aerogel, and the composite article exhibits a thermal conductivity at 500° C. of not more than 0.064 W/m·K.

In some embodiments, the composite article exhibits a thermal conductivity at −160° C. of not more than 0.012 W/m·K.

In some embodiments, the composite article exhibits a thermal conductivity at −70° C. of not more than 0.016 W/m·K.

In some embodiments, a weight ratio of aerogel to fiber in the composite article is 1:4 or higher.

In some embodiments, the composite article contains a binder in an amount less than 10% w/w.

In some embodiments, the fibrous article is a fibrous blanket or a fibrous tube.

Additional features and advantages of embodiments of the present invention are described further below. This summary section is meant merely to illustrate certain features of embodiments of the invention, and is not meant to limit the scope of the invention in any way. The failure to discuss a specific feature or embodiment of the invention, or the inclusion of one or more features in this summary section, should not be construed to limit the invention as claimed.

DETAILED DESCRIPTION

As described above, existing aerogel composite articles typically comprise a single aerogel material, usually a silica aerogel. They also typically include one or more fillers and/or one or more opacifying compounds embedded within the silica aerogel.

In contrast, the present invention provides aerogel composite articles having a fiber-reinforced double-network aerogel constitution comprising primary aerogel network domains and secondary aerogel network domains. The primary aerogel network domains and the secondary aerogel network domains preferably differ from each other in their chemical compositions, but are covalently interconnected to each other. By choosing from various combinations of primary and secondary aerogel network domains, aerogel composite articles with tailored performance are obtainable.

For example, primary aerogel network domains comprising an iron oxide-silica hybrid aerogel exhibit an opacifying effect (reduced transparency at infrared wavelengths) at elevated temperatures, while secondary aerogel network domains comprising hydrophobic silica aerogel ensure hydrophobicity and low thermal conductivity at ambient temperature of the double-network aerogel. As a result, a composite article generated from this double-network aerogel without any further opacifying compounds exhibits both improved thermal conductivity at elevated temperatures as well as hydrophobicity and low thermal conductivity at ambient temperature. Furthermore, the covalent interconnections between the primary aerogel network domains and the secondary aerogel network domains can also provide improved technical benefits. For example, in comparison to other aerogel composites comprising standalone opacifying compounds, double-network aerogel composite articles as described above have primary aerogel network domains with opacifying effect that are covalently interconnected by the secondary aerogel network domains and thus are protected from migration and decomposition over time and heat exposure.

In various embodiments, the present invention provides a method for the preparation of a fiber-reinforced double-network aerogel composite article. In some embodiments, the method comprises the steps of:

providing an aerogel composite dispersion comprising a primary aerogel powder, one or more secondary silane precursors, and an organic solvent;
providing a fibrous article comprising inorganic or organic fibers;
combining the fibrous article and the aerogel composite dispersion;
gelating the secondary silane precursors; and
partially or completely removing the organic solvent to obtain the fiber-reinforced double-network aerogel composite article.

The primary aerogel network domains (formed from the primary aerogel powder) and the secondary aerogel network domains (formed from the secondary silane precursors) preferably differ from each other in their chemical compositions. In various embodiments, the primary aerogel powder is selected from the group consisting of alumina aerogel, iron oxide aerogel, alumina-silica hybrid aerogel, iron oxide-silica hybrid aerogel, and combinations thereof.

In some embodiments, the aerogel composite dispersion is formed by the following steps, the fibrous article being combined with the result of step (iv):

(i) dispersing the primary aerogel powder in the organic solvent;
(ii) adding the secondary silane precursors without hydrolysis to the result of step (i), and mixing to disperse the secondary silane precursors around the primary aerogel powder;
(iii) adding an acidic catalyst to the result of step (ii) to catalyze hydrolysis of the secondary silane precursors; and
(iv) adding a basic catalyst to the result of step (iii) to catalyze gelation of the secondary silane precursors.

This is a "gel-on-gel" process, whereby aerogel powder is the starting material (used to form a primary aerogel dispersion) and at least one secondary silane precursor is combined in the primary aerogel dispersion. The composite dispersion is impregnated in a fibrous article (such as, but not limited to, a fibrous blanket or a fibrous tube), and gelation of the secondary silane precursor occurs within the fibrous article. No surface treatment of the wet gel fibrous article is required. In some embodiments, surface modification of the wet gel fibrous article (e.g., to impart hydrophobicity) is specifically not performed. Supercritical drying of the fibrous article is then performed to generate a secondary aerogel structure on the primary aerogel structure, thereby forming a fiber-reinforced double-network aerogel composite article.

Methods according to embodiments of the present invention first prepare a primary aerogel dispersion by dispersing the primary aerogel powder in the organic solvent. The secondary silane precursors are added without hydrolysis in the primary aerogel dispersion. This ensures a homogeneous distribution of the non-hydrolyzed secondary silane precursors around the primary aerogel powder. The hydrolysis of the secondary silane precursors starts after the addition of acidic catalyst. This specific order of steps in the present embodiment allows the formation of a homogeneous double-network aerogel structure. As a result, the surface of the primary aerogel powder is covered by the in-situ hydrolyzed secondary silane precursors and thus the primary aerogel powder can stay stable in the composite dispersion, which ensures a significantly broader process window for the aerogel composite dispersion. The present inventors unexpectedly found that an aerogel composite dispersion prepared via methods according to embodiments of the invention, in the absence of gelation catalyst (e.g., up to, but not including, step (iv) above), can remain homogeneous, and can be cast on fibrous articles, even after standing unstirred for an extended period of time (e.g., at least 14 days post-preparation), optionally above ambient temperature (e.g., about 40° C.). In contrast, an aerogel composite dispersion prepared via other existing approaches, where aerogel powder was added to post-hydrolyzed silane precursors, was unexpectedly found to form initial gelation within one day in the absence of gelation catalyst.

The method is not limited to these steps and may include any number of additional steps before, between and after each of these steps. Preferably, the steps above are consecutive.

The steps of the method described herein may each include additional activities. For example, the step of providing an aerogel composite dispersion comprising a primary aerogel powder and secondary silane precursors and an organic solvent may include providing the aerogel composite dispersion containing additional components other than the primary aerogel powder, the secondary silane precursors, and the organic solvent. Furthermore, the step of combining the fibrous article and the aerogel composite dispersion may include combining not only the fibrous article and the aerogel composite dispersion but further articles, compositions etc.

The fibrous article and the aerogel composite dispersion are preferably combined by impregnating, casting, or soaking the aerogel composite dispersion into the fibrous article, more preferably by impregnating the aerogel composite composition into the fibrous article. Preferably, no surface treatment or modification is performed on the wet gel fibrous article.

Preferably, the partially or completely removing the organic solvent to obtain the fiber-reinforced double-network aerogel composite article by drying includes supercritical drying and ambient pressure drying. More preferably, the partially or completely removing the organic solvent to obtain the fiber-reinforced double-network aerogel composite article is by supercritical drying, which can—for each of the aerogel network domains—prevent pore collapse, improve the strength of the skeleton structure, increase the service temperature of the aerogel, and/or extend the application of the aerogel under high temperature and extreme conditions.

In some embodiments, the conditions of supercritical drying are as follows: ethanol is used as the medium for supercritical drying and nitrogen is used as carrier gas for supercritical drying. The pressure is raised to 2 MPa after purging the kettle with $N_2$ and closing the outlet. The temperature in the kettle is raised to 270° C. at a heating rate of 1° C./min. After holding the temperature for 2-4 h, the pressure in the kettle raises to 8-12 MPa. The water cooling device is opened and the pressure in the kettle is slowly released to ambient pressure. The kettle is purged by N2, and the fiber-reinforced double-network aerogel composite article is obtained after cooling to ambient temperature.

Existing supercritical drying methods typically utilize liquid CO2 as the medium for supercritical drying. However, this would require a solvent exchange within the wet gel from alcohol solvent to liquid CO2. In contrast, methods according to embodiments of the present invention specifically utilize ethanol as the medium when a supercritical drying process is applied. Accordingly, there is no need to perform solvent exchange within the wet gel.

Fiber-reinforced double-network aerogel composite articles produced by methods according to embodiments of the present invention preferably contain 15 to 70% by weight double-network aerogel based on the total weight of the composite article. More preferred is 25 to 60% by weight double-network aerogel, still more preferred is 35 to 50% by weight double-network aerogel based on the total weight of the composite article.

The double-network aerogel composite articles contain primary aerogel network domains and secondary aerogel network domains. The primary aerogel network domains and the secondary aerogel network domains are interconnected. Preferably, the primary aerogel network domains have a domain size in the range of 1 to 100 µm, more preferably in the range of 2 to 50 µm, even more preferably in the range of 5 to 20 µm. The domain size of the primary aerogel network domains is the particle size of the primary aerogel powder.

The thickness of the composite article may vary by application. In some embodiments, the thickness of the composite article is in the range of 0.5 to 60 mm, preferably in the range of 1 to 30 mm, more preferably in the range of 2 to 20 mm.

Using methods according to embodiments of the present invention, it is possible to ensure that at least 50% of the fibers in the composite article have a length of 5 mm or more. In some embodiments, at least 50% of the fibers in the composite article have a length of 10 mm or more. Preferably at least 75% of the fibers in the composite article have a length of 5 mm or more, more preferably at least 75% of the fibers in the composite article have a length of 10 mm or more, even more preferably at least 75% of the fibers in the composite article have a length of 15 mm or more. In certain particularly preferred embodiments, at least 75% of the fibers in the composite article have a length of 20 mm or more.

To improve flame resistance and costs, the composite article may contain less than 10% by weight binder. Preferably, the composite article contains less than 5% by weight binder, more preferably less than 2% by weight binder, even more preferably less than 1% by weight binder, still more preferably less than 0.5% by weight binder, most preferably less than 0.1% by weight binder. Furthermore, the reduction in the amount of binder may be beneficial for flame resistance, cohesion and insulating properties of the composite article as more fibers and/or aerogel can be incorporated in the composite article. The methods used in the prior art generally require the use of a binder to ensure the structural integrity of the composite articles by binding the fibers to each other and to the fillers. As the present invention allows the use of a fibrous article as a starting material, instead of a slurry of fibers and fillers, the amount of binder can be considerably reduced.

As used herein, the term "binder" relates to any materials which are intended to provide adhesion between two solid materials. Preferably, the term "binder" relates to any materials which serve to bind aerogel particles to each other and/or to the fiber. The binders may be of organic or inorganic nature. Particular examples of binders include, but are not limited to, water glass, silicone-based binders, phenolic resin-based binders, melamine resin-based binders, and polyacrylate-based binders.

Furthermore, a weight ratio of aerogel to fiber in the composite article is 1:8 or higher, preferably 1:4 or higher, more preferably 1:2 or higher, even more preferably 1:1 or higher.

The fibrous article used in embodiments of the present invention is preferably selected from batting, nonwovens, mats, felts and needled fiber blankets, which are preferably prepared via an air-lay or a carding process, wherein the fibrous article is preferably a nonwoven fiber blanket or a needled fiber blanket. In various embodiments, the fibrous article contains 90 wt.-% or more, 95 wt.-% or more, and 98 wt.-% or more, of glass fibers, ceramic fibers, basalt fibers, silicate fibers, organic fibers, or combinations thereof.

It is furthermore preferred that the fibrous article has a density of 20 to 350 kg/m³, preferably 50 to 300 kg/m³, more preferably 80 to 250 kg/m³.

When glass fibers are utilized in embodiments, typically 50 wt.-% or more of the fibers in the fibrous article and/or the composite article are glass fibers, while in other embodiments utilizing glass fibers greater levels of glass fibers may be used, including preferably 60 wt.-%, more preferably 70 wt.-%, even more preferably 80 wt.-%, still preferably 90 wt.-% or more, even still more preferably 95 wt.-% or more, or even more 98 wt.-% or more, and even more preferably all of the fibers in the fibrous article and/or the composite article are glass fibers. In certain embodiments the glass fibrous articles have a recommended operating temperature of around 550-650° C. and a chemical composition including 52-56% SiO2, 12-16% Al2O3, 0-6% MgO, and 15-25% CaO, 4-13% B2O3, and 0-2% Na2O+K2O.

When ceramic fibers are utilized in embodiments, typically 50 wt.-% or more of the fibers in the fibrous article and/or the composite article are ceramic fibers, while in other embodiments utilizing greater levels of ceramic fibers may be utilized, including preferably 60 wt.-%, more preferably 70 wt.-%, even more preferably 80 wt.-%, still preferably 90 wt.-% or more, even still more preferably 95 wt.-% or more, or even more 98 wt.-% or more, or even more preferably all of the fibers in the fibrous article and/or the composite article are ceramic fibers. In certain embodiments, the ceramic fibrous articles have a recommended operating temperature of 1100-1300° C. and a chemical composition including 61-67% SiO2, 2-7% MgO, and 27-33% CaO.

When silica fibers are utilized in embodiments, typically 50 wt.-% or more of the fibers in the fibrous article and/or the composite article are silica fibers, while in other embodiments greater levels of silica fibers may be used, including preferably 60 wt.-%, more preferably 70 wt.-%, even more preferably 80 wt.-%, still more preferably 90 wt.-% or more, even still more preferably 95 wt.-% or more, or even more 98 wt.-% or more, or even more preferably all of the fibers in the fibrous article and/or the composite article are silica fibers. In certain embodiments, the silica fibrous articles have a recommended operating temperature of 1000-1100° C. and a chemical composition including 94-98% SiO2, 0-3% Al2O3, and 0-1% Na2O.

The organic solvent used in embodiments of the present invention is an alcohol solvent, preferably selected from C2-12 saturated, unsaturated or partially saturated alcohols or mixtures thereof, more preferably selected from C2-12 saturated straight, branched or cyclic alcohols or mixtures thereof, even more preferably selected from C2-12 saturated straight, branched or cyclic monohydric alcohols or mixtures thereof, still more preferably selected from C2-6 saturated straight, branched or cyclic monohydric alcohols (such as ethanol, 1-propanol, 2-propanol, butanols, pentanols (including cyclopentanol) or hexanols (including cyclohexanol)) or mixtures thereof, still even more preferably selected from ethanol and propanols or mixtures thereof, most preferably ethanol.

The primary aerogel powder used in embodiments of the present invention may be any inorganic aerogel with a chemical composition different from silica aerogel. Preferably, it exhibits an opacifying effect by means of providing reduced transparency at infrared wavelengths. Preferably, it comprises or consists of one or more selected from alumina aerogel, iron oxide aerogel, alumina-silica hybrid aerogel, and iron oxide-silica hybrid aerogel. More preferably, the primary aerogel powder comprises or consists of iron oxide aerogel or iron oxide-silica hybrid aerogel. Even more preferably the primary aerogel powder is iron oxide-silica hybrid aerogel. The primary aerogel powder used in embodiments of the present invention is preferably non-hydrophobic or hydrophilic. For example, with increasing content of iron oxide, the iron-silica hybrid aerogel powder becomes non-hydrophobic. Furthermore, pure iron oxide aerogel powder is hydrophilic.

The specific surface area of the primary aerogel powder is typically 200 m²/g or higher. Preferably it is 300 m²/g or higher, preferably 400 m²/g or higher, and preferably 2000 m²/g or less, more preferably 1500 m²/g or less, even more preferably 1200 m²/g or less, as determined by DIN ISO 9277 2003-05 (Determination of the specific surface area of solids by gas adsorption using the BET method).

In the present invention, it is preferable that the primary aerogel powder has a median particle size (d50) in the range of 1 to 100 μm, preferably 2 to 50 μm, more preferably 5 to 20 μm, as measured by laser diffraction, preferably using a Malvern Mastersizer.

In various embodiments, the primary aerogel powder may be obtained from a sol-gel reaction. For example, in some embodiments, the primary aerogel powder may be an iron oxide-silica hybrid aerogel powder obtained by mixing and gelation of iron salts, organosilane compounds, an inorganic acid, an inorganic gelation catalyst, and an organic solvent. The formed gel is supercritically dried and ground to iron oxide-silica hybrid aerogel powder. The iron oxide-silica hybrid aerogel powder contains typically 5 to 95% by weight of iron oxide, preferably 10 to 90% by weight of iron oxide, more preferably 20 to 80% by weight of iron oxide, even more preferably 40 to 70% by weight of iron oxide. In other embodiments, the primary aerogel powder may be, for example, iron oxide aerogel powder obtained by mixing and gelation of iron salts, a gelating agent, and an organic solvent. The formed gel is supercritically dried and ground to pure iron oxide aerogel powder. Such sol-gel reactions are known in the art (see, e.g., Ceramics International 50 (2): 2976-2986 and U.S. Pat. No. 6,986,818B2, each of which is incorporated by reference herein in its entirety).

The primary aerogel dispersion comprises the primary aerogel powder and the organic solvent. It is to be understood that the primary aerogel dispersion may contain further components.

The primary aerogel dispersion according to embodiments of the present invention typically contains 2 to 25% by weight of primary aerogel powder, preferably 4 to 22% primary aerogel powder, more preferably 6 to 20% primary aerogel powder, even more preferably 8 to 18% by weight of primary aerogel powder, based on the total weight of the primary aerogel dispersion. The remainder is preferably the organic solvent.

The secondary silane precursors used in embodiments of the present invention are preferably selected from the group consisting of tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), polyethylene trimethoxysilane, and combinations thereof. More preferably, at least one organosilane selected from above is included as the secondary silane precursor.

The aerogel composite dispersion comprises the primary aerogel dispersion, the secondary silane precursors, and the organic solvent. It is to be understood that the aerogel composite dispersion may contain further components.

The aerogel composite dispersion typically contains 5 to 40% by weight of secondary silane precursors, preferably 8 to 35% by weight of secondary silane precursors, more preferably 10 to 30% by weight of secondary silane precursors, based on the total weight of the aerogel composite dispersion.

The weight ratio of the primary aerogel powder to the secondary silane precursors in the aerogel composite dispersion is typically 0.01:1 or higher, preferably 0.02:1 or higher.

The aerogel composite dispersion typically contains deionized water and an inorganic acid (acid catalyst) to induce acid hydrolysis of the secondary silane precursors. In various embodiments, these components are provided in a molar ratio of secondary silane precursors to organic solvent to deionized water to inorganic acid of 1 to 20-30 to 3-5 to $1\times10^{-4}$-$5\times10^{-4}$.

The aerogel composite dispersion also typically contains a basic catalyst to catalyze the gelation of the secondary silane precursors, with a typical molar ratio of secondary silane precursors to basic catalyst of 1 to 0.015-0.05. Preferably, the basic catalyst is ammonia with a molar concentration of about 0.2 mol/L in an alcohol solvent.

It is preferred that the combined content of primary aerogel powder, secondary silane precursors, organic solvent and deionized water in the aerogel composite dispersion is 90% by weight or more, preferably 95% by weight or more, more preferably 97% by weight or more, even more preferably 98% by weight or more, still more preferably 99% by weight or more, most preferably 99.5% by weight or more, or 99.8% by weight or more, based on the total weight of the aerogel composite dispersion.

Embodiments of the present invention further include composite articles manufactured by methods according to the present invention. It is to be understood that such composite articles exhibit certain properties resulting from the methods of the present invention. Accordingly, any of the features set out herein with respect to the methods of the present invention, including any preferred ranges, also apply with respect to the composite articles of the present invention.

For example, a composite article according to embodiments of the present invention preferably contains 15 to 70% by weight double-network aerogel based on the total weight of the composite article. The weight ratio of the primary aerogel network domains to the secondary aerogel network domains is typically 0.03:1 or higher. The thickness of the composite article is preferably in the range of 0.5 mm to 60 mm.

Preferably at least 50% of the fibers in the composite article have a length of 5 mm or more. It is furthermore preferred that the weight ratio of aerogel to fiber in the composite article is 1:8 or higher.

The composite article may be defined in further ways, either by referring to its method of production or to its properties.

Accordingly, the composite article of the present invention may be defined as comprising double-network aerogel and fibers, wherein the composite article is obtainable by impregnating, casting or soaking an aerogel composite dispersion comprising a primary aerogel powder, secondary silane precursors and an organic solvent, into a fibrous article comprising glass fiber, ceramic fiber, silica fiber, basalt fiber or organic fiber, and partially or completely removing the organic solvent to obtain the composite article.

In addition, or alternatively, the composite article may be defined as comprising double-network aerogel and fiber, wherein one or more of the following features (i) to (ix) are fulfilled:

(i) The primary aerogel network domains and secondary aerogel network domains differ from each other in their chemical compositions but are covalently interconnected to each other. Preferably, the primary aerogel domains have a domain size in the range of 1 to 100 μm, more preferably in the range of 2 to 50 μm, even more preferably in the range of 5 to 20 μm.

(ii) The primary aerogel domains may be any inorganic aerogel with a chemical composition different from silica aerogel, which is non-hydrophobic or hydrophilic. Preferably, the inorganic aerogel comprises or consists of one or more selected from alumina aerogel, iron oxide aerogel, alumina-silica hybrid aerogel, iron oxide-silica hybrid aerogel. More preferably, the inorganic aerogel comprises or consists of iron oxide aerogel or iron oxide-silica hybrid aerogel. Even more preferably, the aerogel is iron oxide-silica hybrid aerogel.

(iii) The secondary aerogel domains may be any inorganic aerogel, and may be hydrophilic, partially hydrophobic or fully hydrophobic. Preferably, the organic aerogel is generated from tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), polyethylene trimethoxysilane, or a combination thereof. More preferably, at least one organosilane selected from above is included in the generation of the secondary aerogel domains.

(iv) At least 50% of the fibers in the composite article have a length of 5 mm or more. Preferably at least 50% of the fibers in the composite article have a length of 10 mm or more. More preferably at least 75% of the fibers in the composite article have a length of 5 mm or more. Even more preferably at least 75% of the fibers in the composite article have a length of 10 mm or more. Still more preferably at least 75% of the fibers in the composite article have a length of 15 mm or more. Most preferably at least 75% of the fibers in the composite article have a length of 20 mm or more.

(v) The composite article contains less than 10% by weight binder, based on the total weight of the composite article. The content of binder in the composite article contains less than 10% by weight binder, preferably less than 5% by weight binder, more preferably less than 2% by weight binder, even more preferably less than 1% by weight binder, still more preferably less than 0.5% by weight binder, most preferably less than 0.1% by weight binder.

(vi) The weight ratio of aerogel to fiber in the composite article is 1:8 or higher, preferably 1:4 or higher, more preferably 1:2 or higher, even more preferably 1:1 or higher.

(vii) The composite article exhibits a thermal conductivity at 23° C. of not more than 0.027 W/m·K, more preferably not more than 0.025 W/m·K, even more preferably not more than 0.023 W/m·K, still more preferably not more than 0.021 W/m·K, most preferably not more than 0.020 W/m·K.

(viii) The composite article exhibits a thermal conductivity at 300° C. of not more than 0.042 W/m·K, more preferably not more than 0.040 W/m·K, even more preferably not more than 0.038 W/m·K, still more preferably not more than 0.036 W/m·K, most preferably not more than 0.035 W/m·K.

(ix) The composite article exhibits a thermal conductivity at 500° C. of not more than 0.071 W/m·K, more preferably not more than 0.067 W/m·K, further more preferably not more than 0.065 W/m·K, even more preferably not more than 0.063 W/m·K, still more preferably not more than 0.061 W/m·K, most preferably not more than 0.060 W/m·K.

(x) The composite article exhibits a thermal conductivity at −160° C. of not more than 0.015 W/m·K, more preferably not more than 0.014 W/m·K, furthermore preferably not more than 0.013 W/m·K, even more preferably not more than 0.012 W/m·K, most preferably not more than 0.011 W/m·K.

(xi) The composite article exhibits a thermal conductivity at −70° C. of not more than 0.019 W/m·K, more preferably not more than 0.018 W/m·K, furthermore preferably not more than 0.017 W/m·K, even more preferably not more than 0.016 W/m·K, still more preferably not more than 0.015 W/m·K, most preferably not more than 0.014 W/m·K.

The composite article may fulfil one or any number of possible combinations of features (i) to (xi). Alternatively, it is preferred that six, seven or eight of these features are fulfilled.

The composite article preferably contains 15 to 70% by weight double-network aerogel, more preferred 25 to 60% by weight, still more preferred 35 to 50% by weight double-network aerogel based on the total weight of the composite article. Preferably, the composite article has a thickness in the range of 0.5 to 60 mm, preferably in the range of 1 to 30 mm, more preferably in the range of 2 to 20 mm.

It is to be understood that composite articles according to embodiments of the present invention may contain further components, such as but not limited to inert fillers or pigments, flame retardants, and binders. These are preferably added by including them in the aerogel composite dispersion. However, compositions according to embodiments of the present invention need not include fillers, and in certain embodiments specifically exclude fillers comprising phosphates, borates, silicates, metallocenes, molybdates, stannates, hydroxides, carbonates, zinc oxides, aluminium oxides, antimony oxides, magnesium-zinc blends, magnesium-zinc-antimony blends, hydrated forms thereof, and combinations thereof.

Composite articles according to embodiments of the present invention may furthermore be coated with various other materials and/or combined with other materials, such as wovens or laminates, to form further composites.

Examples 1-13

A series of fiber-reinforced double-network aerogel composite articles were prepared using three primary aerogel powders:
Iron oxide-silica hybrid aerogel powder containing 10% by weight of iron oxide;
Iron oxide-silica hybrid aerogel powder containing 60% by weight of iron oxide;
Pure iron oxide aerogel powder.

The procedure for preparing the fiber-reinforced double-network aerogel composite articles according to embodiments of the present invention was as follows:

Step (i): 125 g of one of the three primary aerogel powders listed above was dispersed using standard lab mixing equipment (specifically, a propeller mixer) in ethanol to form a primary aerogel powder dispersion with a solid content of 17% by weight.

Step (ii): Tetraethoxy orthosilicate (TEOS) and methyl triethoxysilane (MTES) were added as secondary silane precursors to the primary aerogel powder dispersion, with a weight ratio TEOS:MTES of 1:1. The weight ratio of the primary aerogel powder to secondary silane precursors in the aerogel composite dispersion was 0.02:1. The formed aerogel composite dispersion was further diluted by adding ethanol. Standalone pigments (Fe3O4 or graphite) may be added to the aerogel composite dispersion, with a weight ratio of standalone pigment to the secondary silane precursors of 0.005-0.01 to 1.

Step (iii): An acidic catalyst comprising deionized water and hydrochloric acid was added to the aerogel composite dispersion to induce acid hydrolysis of the secondary silane precursors, with a molar ratio of secondary silane precursors to ethanol to deionized water and to hydrochloric acid of 1:20:3:10-4. After stirring at ambient temperature for 4 hours, ammonia with a molar concentration of 0.2 mol/L in ethanol was added as a basic catalyst to the aerogel composite dispersion, with a molar ratio of secondary silane precursors to ammonia of 1:0.015. The catalyzed aerogel composite dispersion was immediately cast at ambient temperature onto a 1.5×3 m fibrous blanket selected from glass fiber blanket for Examples 1-9 and 11 (raw blanket density between 90 and 120 kg/m$^3$), and silica fiber blanket for Examples 12 and 13 (raw blanket density between 100 and 120 kg/m$^3$).

After gelation of the secondary silane precursors, the fiber-reinforced double-network aerogel composite article according to embodiments of the present invention was sealed and stood for 24 hours before being supercritically dried. Ethanol was used as the medium for supercritical drying. The drying kettle was purged by nitrogen gas, before the outlet was closed and the pressure was increased to 2 MPa. The kettle was heated to 270° C. at a heating rate of 1° C./min. This temperature was kept for 2-4 hours until the pressure in the kettle increased to 8-12 MPa. The pressure in the kettle was slowly released to ambient pressure, and the kettle was purged with nitrogen gas. After cooling to ambient temperature, a fiber-reinforced double-network aerogel composite article was obtained.

Example 10 was prepared in a similar way as described above, but using a glass fiber tube with a wall thickness of 25 mm and an inner diameter of 22 mm as the fiber-reinforcement for the double-network aerogel.

In some embodiments, the pure iron oxide (Fe2O3) aerogel powder was formed by: preparing a 0.5M solution of Fe(NO3)3 by dissolving Fe(NO3)3·9H2O particles in ethanol and stirring for 30 min; dropping propylene oxide (catalyst to promote gelation) into the Fe(NO3) 3 solution slowly with simultaneous stirring; aging for 24-48 hours; and supercritical drying using ethanol as the medium and nitrogen as the carrier gas as described above. Preferably, the molar ratio of Fe(NO3)3 solution and propylene oxide is 1:1, 1:6, or 1:9. In one example, the specific surface area was about 520.00 m$^2$/g and the average pore size was about 12.00 nm.

Reference Sample

A reference sample was prepared using pure silica aerogel as primary aerogel powder: Step (i): 125 g of pure silica aerogel powder was dispersed using standard lab mixing equipment (specifically a propeller mixer) in ethanol to form a primary aerogel powder dispersion with a solid content of 17% by weight.

Step (ii): Tetraethoxy orthosilicate (TEOS) and methyl triethoxysilane (MTES) were added as secondary silane precursors to the primary aerogel powder dispersion, with a weight ratio TEOS:MTES of 1:1. The weight ratio of the primary aerogel powder to secondary silane precursors in the aerogel composite dispersion was 0.02:1. The formed aerogel composite dispersion was further diluted by adding ethanol.

Step (iii): An acidic catalyst comprising deionized water and hydrochloric acid was added to aerogel composite dispersion to induce acid hydrolysis of the secondary silane precursors, with a molar ratio of secondary silane precursors to ethanol to deionized water and to hydrochloric acid of 1:20:3:10-4. After stirring at ambient temperature for 4 hours, ammonia with a molar concentration of 0.2 mol/L in ethanol was added as a basic catalyst to the aerogel composite dispersion, with a molar ratio of secondary silane precursors to ammonia of 1:0.015. The catalyzed aerogel composite dispersion was immediately cast at ambient temperature onto a 1.5×3 m glass fiber blanket (raw blanket density of 110 kg/m$^3$).

After gelation of the secondary silane precursors, the reference sample was sealed and stood for 24 hours before being supercritically dried. Ethanol was used as the medium for supercritical drying. The drying kettle was purged by nitrogen gas, before the outlet was closed and the pressure was increased to 2 MPa. The kettle was heated to 270° C. at a heating rate of 1° C./min. This temperature was kept for 2-4 hours until the pressure in the kettle increased to 8-12 MPa. The pressure in the kettle was slowly released to ambient pressure, and the kettle was purged with nitrogen gas. After cooling to ambient temperature, a fiber-reinforced aerogel composite article as reference sample was obtained.

Table 1 summarizes the composition of the fiber-reinforced double-network aerogel composite articles prepared as described above (Examples 1-13 and a reference sample), with or without (w/o) standalone pigment, and Tables 2 and 3 show their thermal conductivity (TC) results.

TABLE 1

| Example | Primary aerogel powder | Primary aerogel powder loading level[a] [wt-%] | Secondary aerogel loading level[a] [wt-%] | Standalone pigment | Standalone pigment loading level[a] [wt-%] |
|---|---|---|---|---|---|
| 1 | Iron oxide-silica hybrid aerogel (10 wt-% of iron oxide) | 2.1 | 30.5 | w/o | w/o |
| 2 | Iron oxide-silica hybrid aerogel (10 wt-% of iron oxide) | 1.2 | 33.4 | w/o | w/o |
| 3 | Iron oxide-silica hybrid aerogel (10 wt-% of iron oxide) | 1.2 | 33.6 | Graphite | 0.6 |
| 4 | Iron oxide-silica hybrid aerogel (60 wt-% of iron oxide) | 2.3 | 32.7 | w/o | w/o |
| 5 | Iron oxide-silica hybrid aerogel (60 wt-% of iron oxide) | 2.2 | 31.8 | Fe3O4 | 1.1 |
| 6 | Iron oxide-silica hybrid aerogel (60 wt-% of iron oxide) | 2.3 | 32.7 | Graphite | 0.6 |
| 7 | Pure iron oxide aerogel | 2.3 | 33.7 | w/o | w/o |
| 8 | Pure iron oxide aerogel | 1.9 | 27.9 | Fe3O4 | 1.0 |
| 9 | Pure iron oxide aerogel | 2.1 | 30.9 | Graphite | 1.1 |
| 10[b] | Iron oxide-silica hybrid aerogel (60 wt-% of iron oxide) | 2.2 | 25.2 | w/o | w/o |
| 11 | Iron oxide-silica hybrid aerogel (60 wt-% of iron oxide) | 2.4 | 34.8 | Graphite | 1.2 |
| 12 | Iron oxide-silica hybrid aerogel (60 wt-% of iron oxide) | 2.3 | 32.7 | Graphite | 1.1 |
| 13 | Iron oxide-silica hybrid aerogel (60 wt-% of iron oxide) | 2.3 | 33.0 | Graphite | 1.1 |
| Reference | Pure silica aerogel powder | 2.4 | 34.2 | w/o | w/o |

[a]Loading level of component in the fiber-reinforced double-network aerogel composite article after supercritical drying.
[b]Example 10 was prepared using a glass fiber tube as the fiber-reinforcement.

TABLE 2

| Example | TC at 23° C. [W/m · K] | TC at 55° C. [W/m · K] | TC at 150° C. [W/m · K] | TC at 300° C. [W/m · K] | TC at 500° C. [W/m · K] | TC at −160° C. [W/m · K] | TC at −70° C. [W/m · K] | TC at 0° C. [W/m · K] |
|---|---|---|---|---|---|---|---|---|
| 1 | 0.0193 | — | — | — | — | — | — | — |
| 2 | 0.0190 | — | — | — | — | — | — | — |
| 3 | 0.0191 | 0.0192 | 0.0226 | 0.0332 | 0.0619 | — | — | — |
| 4 | 0.0197 | 0.0208 | 0.0251 | 0.0383 | 0.0707 | — | — | — |
| 5 | 0.0192 | 0.0199 | 0.0236 | 0.0348 | 0.0629 | — | — | — |
| 6 | 0.0188 | 0.0198 | 0.0233 | 0.0342 | 0.0615 | 0.0113 | 0.0154 | 0.0180 |
| 7 | 0.0189 | 0.0201 | 0.0240 | 0.0358 | 0.0638 | — | — | — |
| 8 | 0.0194 | 0.0213 | 0.0252 | 0.0368 | 0.0636 | — | — | — |
| 9 | 0.0191 | 0.0206 | 0.0241 | 0.0342 | 0.0581 | — | — | — |
| 11 | 0.0159 | 0.0166 | 0.0194 | — | — | 0.0107 | 0.0139 | 0.0157 |
| 12 | 0.0183 | 0.0192 | 0.0219 | 0.0307 | 0.0541 | — | — | — |
| 13 | 0.0180 | 0.0189 | 0.0218 | 0.0306 | 0.0550 | — | — | — |
| Reference | 0.0211 | 0.0215 | 0.0262 | 0.0407 | 0.0785 | — | — | — |

TABLE 3

| Example | TC at 0° C. [W/m · K] | TC at 10° C. [W/m · K] | TC at 20° C. [W/m · K] | TC at 40° C. [W/m · K] |
|---|---|---|---|---|
| 10 | 0.0241 | 0.0250 | 0.0259 | 0.0277 |

TC at Ambient Temperature

Thermal conductivity of Examples 1-9, 11-13 and the reference sample at 23° C. was measured according to the standard DIN EN 12667 by using the heat flow meter method with a LaserComp Fox 200 device. The specimens were cut into a dimension of 200×200 mm and their thermal conductivity at 23° C. was recorded. Thermal conductivity of Example 10 in a temperature range of 0 to 40° C. was measured according to the standard DIN EN ISO 8497 by using a Netzsch TLR 1000 device. The specimen has an inner diameter of 24 mm, a wall thickness of 23 mm and a length of 1000 mm.

Except the double-network aerogel composite article in a tubular form (Example 10), all the other double-network aerogel composite articles (Examples 1-9, 11-13) show thermal conductivity at 23° C. of lower than 20 mW/m·K. This confirms that the secondary aerogel network domains ensure low thermal conductivity of the fiber-reinforced double-network aerogel composite articles at ambient temperature.

TC at Elevated Temperature

Thermal conductivity of Examples 3-9, 11-13 and the reference sample at elevated temperature was measured according to ASTM C177 on a Netzsch GHP-456 Titan in a temperature range of from 55 to 500° C. The specimen was cut into a dimension of 300×300 mm and measured under a pressure of 1.5 kPa.

The opacifying effect of the primary aerogel network domains formed by iron oxide-silica hybrid aerogel or pure iron oxide aerogel is clearly observed. Compared against the reference sample with 2.4% by weight of pure silica aerogel primary powder, the double-network aerogel composite article with 2.3% by weight of iron oxide-silica hybrid aerogel primary powder (Example 4) shows a lower TC at 500° C. by 8 mW/m·K, while the double-network aerogel composite article with 2.3% by weight of pure iron oxide primary aerogel powder (Example 7) shows an even lower TC at 500° C. by 15 mW/m·K.

An inclusion of graphite as standalone pigment at a loading level of 0.5-1.0% by weight of the double-network aerogel composite article further improves its thermal conductivity at elevated temperature. The examples containing graphite as standalone pigment (Examples 6 and 9) show significantly lower thermal conductivity values as compared to the examples with a comparable loading level of primary aerogel and secondary aerogel network domains but without standalone pigment (Examples 4 and 7). This indicates a synergistic effect of graphite and iron oxide-silica hybrid aerogel or pure iron oxide aerogel. Exemplary Delta thermal conductivity values between Example 6 (with 0.6% by weight graphite) and Example 4 (without any standalone pigment) are up to 3.5 mW/m·K at 300° C. and 8.0 mW/m·K at 500° C.

TC at Low Temperature

Thermal conductivity of Examples 6 and 11 at low temperature was measured according to ASTM C177 on a Netzsch GHP-456 Titan in a temperature range of from −160 to 0° C. by utilizing liquid nitrogen for cooling and holding the temperature. The measured thermal conductivity values for Example 6 are 11.3, 15.4 and 18.0 mW/m·K at −160° C., −70° C. and 0° C., respectively, while 10.7, 13.9 and 15.7 mW/m·K at −160° C., −70° C. and 0° C. were measured for Example 11.

While there have been shown and described fundamental novel features of the invention as applied to the preferred and illustrative embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, various features and structures of the different embodiments discussed herein may be combined and interchanged. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

The invention claimed is:

1. A method of manufacturing a fiber-reinforced double-network aerogel composite article, the method comprising:
preparing an aerogel composite dispersion comprising a non-hydrophobic primary aerogel powder, one or more secondary silane precursors, and an organic solvent, wherein the aerogel composite dispersion is formed by:
(i) preparing a primary aerogel dispersion by dispersing the primary aerogel powder in the organic solvent;

(ii) adding the secondary silane precursors without hydrolysis to the primary aerogel dispersion obtained in step (i), and mixing to disperse the secondary silane precursors around the primary aerogel powder;

(iii) adding an acidic catalyst to the result of step (ii) to catalyze hydrolysis of the secondary silane precursors; and (iv) adding a basic catalyst to the result of step (iii);

combining the aerogel composite dispersion with a fibrous article, whereby gelation of the secondary silane precursors occurs within the fibrous article; and partially or completely removing the organic solvent to obtain the fiber-reinforced double-network aerogel composite article.

2. The method of claim 1, wherein the primary aerogel powder is a non-hydrophobic powder with opacifying effect, and is selected from the group consisting of alumina aerogel, iron oxide aerogel, alumina-silica hybrid aerogel, iron oxide-silica hybrid aerogel, and combinations thereof.

3. The method of claim 2, wherein the primary aerogel powder is iron oxide aerogel, iron oxide-silica hybrid aerogel, or a combination thereof.

4. The method of claim 1, wherein the organic solvent is an alcohol solvent or a mixture of alcohol solvents.

5. The method of claim 1, wherein the one or more secondary silane precursors are selected from the group consisting of tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), and polyethylene trimethoxysilane.

6. The method of claim 1, wherein a weight ratio of the primary aerogel powder to the one or more secondary silane precursors in the aerogel composite dispersion is 0.01:1 or higher.

7. The method of claim 1, wherein the acid catalyst comprises deionized water and an inorganic acid, and wherein a molar ratio of the secondary silane precursors to the organic solvent to the deionized water to the inorganic acid is $1:20-30:3-5:10^{-4}-5\cdot10^{-4}$.

8. The method of claim 7, wherein the inorganic acid is hydrochloric acid.

9. The method of claim 1, wherein a molar ratio of the secondary silane precursors to the basic catalyst is 1:0.015-0.05.

10. The method of claim 9, wherein the basic catalyst is ammonia with a molar concentration of 0.2 mol/L in alcohol solvent.

11. The method of claim 1, wherein the fibrous article is selected from wovens or non-wovens composed of glass fiber, ceramic fiber, silica fiber, basalt fiber, or organic fiber.

12. The method of claim 1, wherein the combining comprises impregnating the aerogel composite dispersion into the fibrous article.

13. The method of claim 1, wherein the removing the organic solvent comprises supercritical drying or ambient pressure drying.

14. The method of claim 13, wherein the removing the organic solvent comprises supercritical drying using ethanol as the drying medium and nitrogen as the carrier gas.

15. The method of claim 1, wherein a weight ratio of aerogel to fiber in the fiber-reinforced double-network aerogel composite article is 1:4 or higher.

16. A fiber-reinforced double-network aerogel composite article prepared by a method comprising:

preparing an aerogel composite dispersion comprising a non-hydrophobic primary aerogel powder, one or more secondary silane precursors, and an organic solvent, wherein the aerogel composite dispersion is formed by:

(i) preparing a primary aerogel dispersion by dispersing the primary aerogel powder in the organic solvent;

(ii) adding the secondary silane precursors without hydrolysis to the primary aerogel dispersion obtained in step (i), and mixing to disperse the secondary silane precursors around the primary aerogel powder;

(iii) adding an acidic catalyst to the result of step (ii) to catalyze hydrolysis of the secondary silane precursors; and (iv) adding a basic catalyst to the result of step (iii);

combining the aerogel composite dispersion with a fibrous article, whereby gelation of the secondary silane precursors occurs within the fibrous article; and partially or completely removing the organic solvent to obtain the fiber-reinforced double-network aerogel composite article.

17. The composite article of claim 16, wherein a weight ratio of the primary aerogel powder to the one or more secondary silane precursors in the aerogel composite dispersion is 0.01:1 or higher.

18. The composite article of claim 16, wherein the primary aerogel powder is a non-hydrophobic powder with opacifying effect, and is selected from the group consisting of alumina aerogel, iron oxide aerogel, alumina-silica hybrid aerogel, iron oxide-silica hybrid aerogel, and combinations thereof.

19. The composite article of claim 18, wherein the primary aerogel powder is iron oxide aerogel, iron oxide-silica hybrid aerogel, or a combination thereof.

20. The composite article of claim 16, wherein the organic solvent is an alcohol solvent or a mixture of alcohol solvents.

21. The composite article of claim 16, wherein the one or more secondary silane precursors are selected from the group consisting of tetraethoxy orthosilicate (TEOS), methyl triethoxysilane (MTES), methyl trimethoxysilane (MTMS), phenyltriethoxysilane (PTES), phenyltrimethoxysilane (PTMS), vinyltrimethoxysilane (VTMS), vinyl triethoxysilane (VTES), and polyethylene trimethoxysilane.

22. The composite article of claim 16, wherein the acid catalyst comprises deionized water and an inorganic acid, and wherein a molar ratio of the secondary silane precursors to the organic solvent to the deionized water to the inorganic acid is $1:20-30:3-5:10^{-4}-10^{-4}$.

23. The composite article of claim 22, wherein the inorganic acid is hydrochloric acid.

24. The composite article of claim 16, wherein a molar ratio of the secondary silane precursors to the basic catalyst is 1:0.015-0.05.

25. The composite article of claim 24, wherein the basic catalyst is ammonia with a molar concentration of 0.2 mol/L in alcohol solvent.

26. The composite article of claim 16, wherein the fibrous article is selected from wovens or non-wovens composed of glass fiber, ceramic fiber, silica fiber, basalt fiber, or organic fiber.

27. The composite article of claim 16, wherein the combining comprises impregnating the aerogel composite dispersion into the fibrous article.

28. The composite article of claim 16, wherein the removing the organic solvent comprises supercritical drying or ambient pressure drying.

29. The composite article of claim 28, wherein the removing the organic solvent comprises supercritical drying using ethanol as the drying medium and nitrogen as the carrier gas.

30. The composite article of claim 16, wherein a weight ratio of aerogel to fiber in the fiber-reinforced double-network aerogel composite article is 1:4 or higher.

* * * * *